(12) United States Patent
Homma et al.

(10) Patent No.: US 8,780,057 B2
(45) Date of Patent: Jul. 15, 2014

(54) INFORMATION PROCESSING APPARATUS AND ESTIMATING METHOD

(75) Inventors: Fuminori Homma, Tokyo (JP); Tatsushi Nashida, Kanagawa (JP)

(73) Assignee: Sony Corporation, Tokyo (JP)

( * ) Notice: Subject to any disclaimer, the term of this patent is extended or adjusted under 35 U.S.C. 154(b) by 412 days.

(21) Appl. No.: 12/726,728

(22) Filed: Mar. 18, 2010

(65) Prior Publication Data

US 2010/0229091 A1    Sep. 9, 2010

(30) Foreign Application Priority Data

Apr. 3, 2009  (JP) ................................ P2009-091305

(51) Int. Cl.
*G06F 3/041* (2006.01)

(52) U.S. Cl.
USPC ........... 345/173; 345/174; 345/175; 345/176; 345/177; 345/178; 715/702; 340/4.12

(58) Field of Classification Search
USPC ................... 715/702; 345/173–178; 340/4.12
See application file for complete search history.

(56) References Cited

U.S. PATENT DOCUMENTS

| 2006/0026521 | A1 | 2/2006 | Hotelling et al. |
| 2006/0097991 | A1* | 5/2006 | Hotelling et al. ............. 345/173 |
| 2008/0068343 | A1* | 3/2008 | Hoshino et al. ............... 345/173 |
| 2008/0180404 | A1 | 7/2008 | Han et al. |

FOREIGN PATENT DOCUMENTS

| JP | 2006-126997 | 5/2006 |
| JP | 2008-165575 | 7/2008 |

OTHER PUBLICATIONS

European Search Report dated Jul. 30, 2010, in EP 10 25 0373.

* cited by examiner

*Primary Examiner* — Alexander S Beck
*Assistant Examiner* — Amen Bogale
(74) *Attorney, Agent, or Firm* — Sherr & Jiang, PLLC

(57) ABSTRACT

Provided is an information processing apparatus including an operation display unit for displaying a display screen and detecting an operation location on the display screen based upon a user operation on the display screen, a pressure detecting unit including a plurality of pressure sensors for detecting a pressure value according to the user operation on the operation display unit for each of the plurality of pressure sensors, an operation type determining unit for determining a type of the user operation, a deriving unit for selectively deriving a barycentric location on the display screen based upon detection results from the plurality of pressure sensors, based upon a determination result from the operation type determining unit, and an estimating unit for estimating a pressure value on the operation location, based upon a derivation result from the deriving unit and upon information of barycentric location candidates.

15 Claims, 12 Drawing Sheets

| POINT A (100, 100) | POINT B (200, 100) | BARYCENTRIC (INTERNALLY DIVIDING) COORDINATE | BARYCENTRIC PRESSURE |
|---|---|---|---|
| 0 | 0 | (150, 100) | 0 |
| 1 | 0 | (100, 100) | 0.5 |
| ⋮ | ⋮ | ⋮ | ⋮ |
| 255 | 0 | (100, 100) | 127.5 |

(b)

| POINT A (100, 100) | POINT B (200, 100) | BARYCENTRIC (INTERNALLY DIVIDING) COORDINATE | BARYCENTRIC PRESSURE |
|---|---|---|---|
| 0 | 1 | (200, 100) | 0.5 |
| 1 | 1 | (150, 100) | 1 |
| ⋮ | ⋮ | ⋮ | ⋮ |
| 255 | 1 | (101, 100) | 128 |

(c)

| POINT A (100, 100) | POINT B (200, 100) | BARYCENTRIC (INTERNALLY DIVIDING) COORDINATE | BARYCENTRIC PRESSURE |
|---|---|---|---|
| 0 | 2 | (200, 100) | 1 |
| 1 | 2 | (166, 100) | 1.5 |
| ⋮ | ⋮ | ⋮ | ⋮ |
| 255 | 2 | (102, 100) | 128.5 |

(d)

| POINT A (100, 100) | POINT B (200, 100) | BARYCENTRIC (INTERNALLY DIVIDING) COORDINATE | BARYCENTRIC PRESSURE |
|---|---|---|---|
| 0 | 255 | (200, 100) | 127.5 |
| 1 | 255 | (199, 100) | 128 |
| ⋮ | ⋮ | ⋮ | ⋮ |
| 255 | 255 | (150, 100) | 255 |

FIG. 8

| S1 (TOP LEFT) (0, 0) | S2 (TOP RIGHT) (300, 0) | S3 (BOTTOM LEFT) (0, 300) | S4 (BOTTOM RIGHT) (300, 300) | BARYCENTRIC (INTERNALLY DIVIDING) COORDINATE | BARYCENTRIC PRESSURE |
|---|---|---|---|---|---|
| 0 | 0 | 0 | 0 | (150, 150) | 0 |
| 1 | 0 | 0 | 0 | (0, 0) | 1 |
| ... | ... | ... | ... | ... | ... |
| 255 | 0 | 0 | 0 | (0, 0) | 255 |
| ... | ... | ... | ... | ... | ... |
| 255 | 255 | 0 | 0 | (150, 0) | 255 |
| ... | ... | ... | ... | ... | ... |
| 255 | 255 | 255 | 0 | (75, 150) | 255 |
| ... | ... | ... | ... | ... | ... |
| 255 | 255 | 255 | 255 | (150, 150) | 255 |

INFORMATION PROCESSING APPARATUS AND ESTIMATING METHOD

BACKGROUND OF THE INVENTION

1. Field of the Invention

The present invention relates to an information processing apparatus and an estimating method.

2. Description of the Related Art

In recent years, information processing apparatuses with touch screens are becoming more popular, such as mobile phones and ATMs (Automated Teller Machines), for example.

In such circumstances, a technique for improving the functions of a touch screen has been developed. For example, JP 2008-165575 (A) describes a technique for estimating two coordinates corresponding to a user operation if a user has operated two points on a touch screen. For example, JP 2006-126997 (A) describes a technique for detecting the coordinate and the pressure value for one point on a display screen on which a user operation has been made.

SUMMARY OF THE INVENTION

In light of the fact that the only coordinate of the barycentric location will be allowed to be detected, according to the typical technique for estimating two coordinates corresponding to a user operation (to be referred to as the "typical technique 1" hereinafter), the coordinates for two points on the display screen corresponding to the user operation is estimated on the basis of a detection result from the touch screen. Accordingly, an information processing apparatus to which the typical technique 1 is applied may distinguish the case where one coordinate has been detected from the case where two coordinates have been detected, so that a process depending upon a distinction result can be realised. Consequently, the information processing apparatus to which the typical technique 1 is applied might improve the functions to some extent.

According to the typical technique for detecting one coordinate on a display screen on which a user operation has been made and the pressure value for the coordinate (to be referred to as the "typical technique 2" hereinafter), one coordinate on the display screen corresponding to a user operation and the pressure value for the coordinate can be detected. Accordingly, an information processing apparatus to which the typical technique 2 is applied can realise a process depending upon the detected pressure value. Consequently, the information processing apparatus to which the typical technique 2 is applied might improve the functions to some extent.

As described above, by use of the typical technique 1, information (e.g., the coordinates) of two operation locations on the display screen corresponding to a user operation is acquired, and by use of the typical technique 2, the pressure value for one operation location on the display screen corresponding to a user operation is acquired. However, even by use of the typical technique 1 and/or the typical technique 2 (to be collectively referred to as the "typical techniques" hereinafter), the pressure values for multiple operation locations on the display screen corresponding to a user operation would not be allowed to be acquired. Thus, with an information processing apparatus to which the typical techniques are applied (to be referred to as "the typical information processing apparatus" hereinafter), processes depending upon the pressure values for multiple operation locations on the display screen corresponding to a user operation would be far from realisation.

In light of the foregoing, it is desirable to provide an information processing apparatus and an estimating method, which are novel and improved, and which allow estimation of the pressure values for multiple operation locations on a display screen corresponding to a user operation.

According to an embodiment of the present invention, there is provided an information processing apparatus including an operation display unit for displaying a display screen and detecting an operation location on the display screen based upon a user operation on the display screen, a pressure detecting unit including a plurality of pressure sensors for detecting a pressure value according to the user operation on the operation display unit for each of the plurality of pressure sensors, an operation type determining unit for determining a type of the user operation, based upon a detection result from the operation display unit, a deriving unit for selectively deriving a barycentric location on the display screen based upon detection results from the plurality of pressure sensors, based upon a determination result from the operation type determining unit, and an estimating unit for estimating a pressure value on the operation location, based upon a derivation result from the deriving unit and upon information of barycentric location candidates in which information of a combination of pressure values on a plurality of locations on the display screen is recorded in correspondence with information of the barycentric location.

By such an arrangement, the pressure values for multiple operation locations on a display screen corresponding to a user operation can be estimated.

The estimating unit may estimate that the pressure value of the operation location is a combination of pressure values amongst combinations of pressure values recorded in the information of barycentric location candidates, by which the information of the barycentric location is in correspondence with the barycentric location derived by the deriving unit.

The deriving unit may also derive a pressure value on the barycentric location, and the estimating unit may estimate a pressure value on the operation location, based upon a derived result from the deriving unit and upon the information of barycentric location candidates in which information of the pressure value on the barycentric location is recorded in further correspondence with the information of the barycentric location.

The operation type determining unit may determine a first operation type corresponding to a case where a plurality of operating locations have been detected or a second operation type corresponding to a case where one operation location has been detected, based upon a number of the operation location detected by the operation display unit, and the deriving unit may derive the barycentric location if a determination result indicating the first operation type is sent from the operation type determining unit.

The deriving unit may not derive the barycentric location if a determination result indicating the second operation type is sent from the operation type determining unit.

The information processing apparatus may further include a processing unit for execute a process depending upon the detection result from the operation display unit and/or a detection result from the pressure detecting unit or a process depending upon the detection result from the operation display unit and/or an estimation result from the estimating unit, based upon the determination result from the operation type determining unit.

The information processing apparatus may further include a storage unit in which the information of barycentric location candidates can be stored, and may also include an information of barycentric location candidates generating unit for selectively generating the information of barycentric location candidates. The information of barycentric location candidates generating unit may generate the information of barycentric location candidates if a determination result indicating a first operation type corresponding to a case where a plurality of operation locations have been detected by the operation display unit is sent from the operation type determining unit and if no information of barycentric location candidates is not stored in the storage unit.

According to another embodiment of the present invention, there is provided the information processing method including the steps of determining a type of a user operation, based upon a detection result from an operation display unit for displaying a display screen and detecting an operation location on the display screen based upon a user operation on the display screen, deriving selectively a barycentric location on the display screen based upon detection results from a plurality of pressure sensors for each detecting a pressure value according to the user operation on the display screen, based upon a determination result from the step of determining, and estimating a pressure value on the operation location, based upon a derivation result from the step of deriving and upon information of barycentric location candidates in which information of a combination of pressure values on a plurality of locations on the display screen is recorded in correspondence with information of the barycentric location.

By use of such a method, the pressure values for multiple operation locations on a display screen corresponding to a user operation can be estimated.

According to the embodiments of the present invention described above, pressure values for multiple operation locations on a display screen corresponding to a user operation can be estimated.

BRIEF DESCRIPTION OF THE DRAWINGS

FIG. 5 is an illustration that shows an example of information of barycentric location candidates according to the embodiments of the present invention.

FIG. 8 is an illustration that shows an example of the results of deriving the location and the barycentric pressure by an information processing apparatus according to the embodiments of the present invention.

DETAILED DESCRIPTION OF THE EMBODIMENT(S)

Figure 1:
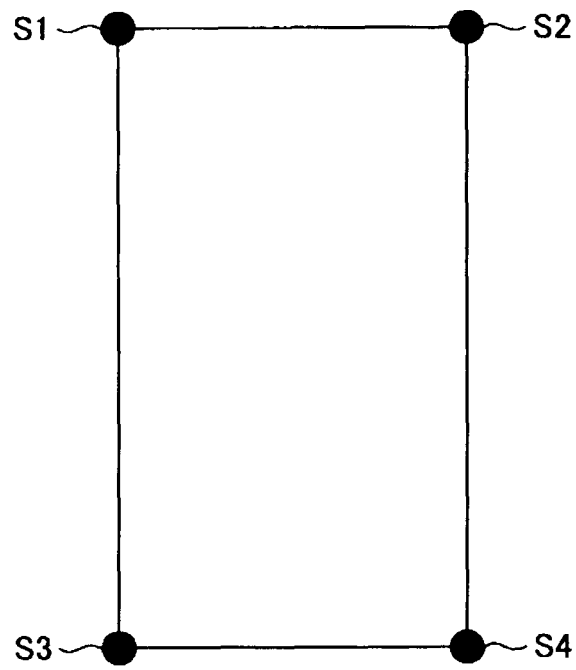
FIG. 1 is an illustration for illustrating the overview of the estimation approach according to the embodiments of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The descriptions will be presented hereinafter in the order of:
1. Approach According to Embodiments of Present Invention;
2. Information Processing Apparatus According to Embodiments of Present Invention; and
3. Program According to Embodiments of Present Invention.
(Approach According to Embodiments of Present Invention)

Before an information processing apparatus (to be referred to as the "information processing apparatus 100" hereinafter) is described, an estimation approach according to the embodiments of the present invention will be described.
[Overview of Estimation Approach According to Embodiments of Present Invention]

Figure 2:
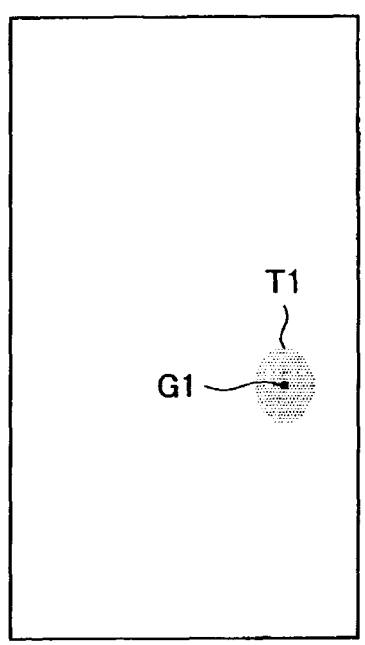
FIG. 2 is an illustration for illustrating the overview of the estimation approach according to the embodiments of the present invention
Figure 3:
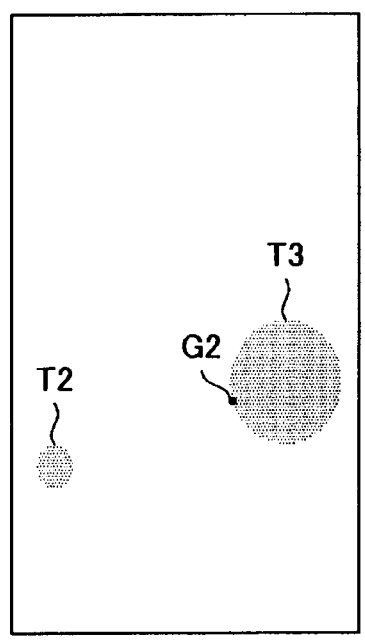
FIG. 3 is an illustration for illustrating the overview of the estimation approach according to the embodiments of the present invention

FIG. 1-FIG. 3 are illustrations for illustrating the overview of the estimation approach according to the embodiments of the present invention, where FIG. 1 shows an exemplary arrangement of pressure sensors included in the information processing apparatus 100 whilst each of FIG. 2-FIG. 3 shows a display screen displayed on a touch screen.

Besides, the information processing apparatus 100 shown in FIG. 1-FIG. 3 is arranged to include the touch screen for displaying a rectangular display screen, but it may be arranged differently. For example, the information processing apparatus 100 may include a touch screen in any shape, such as a round shape, a polygonal shape, etc. In the following explanation, by way of example only, the information processing apparatus 100 is arranged to include the touch screen for displaying the rectangular display screen.

In order to detect a pressure value corresponding to a user operation on the display screen displayed on the touch screen, the information processing apparatus 100 includes pressure sensors S1-S4 on the locations corresponding to the four corners of the display screen, respectively, as shown in FIG. 1.

Besides, the number of the pressure sensors included in the information processing apparatus 100 according to the embodiments of the present invention is not limited to 4 as shown in FIG. 1. For example, the information processing apparatus 100 according to the embodiments of the present invention may include a given number of pressure sensors that can identify, based upon a pressure value detected in accordance with a user operation, the barycentric location of the plane including the display screen. The information processing apparatus 100 may express given locations on the display screen, which locations includes the barycentric location, by two-dimensional coordinates, where the origin is at a given location on the display screen (e.g., at the location of the bottom left corner of the display screen); but the information processing apparatus 100 may express them differently. In the following explanation, the information processing apparatus 100 expresses a location on the display screen by a two-dimensional coordinate.

If the information processing apparatus 100 includes the pressure sensors S1-S4 as shown in FIG. 1, it detects a pressure value according to a user operation which is given by a user touching the display screen (and which may be referred to as a "touch operation" hereinafter). Based upon the detection results from the pressure sensor S1-S4, the information processing apparatus 100 then derives the barycentric location according to the touch operation, and also derives a pressure value for the barycentric location (to be referred to as a "barycentric pressure" hereinafter). Besides, how to derive the barycentric location and the barycentric pressure according to the embodiments of the present invention will be described later.

[a] In Case where User has Made Touch Operation on 1 Point on Display Screen (FIG. 2)

FIG. 2 shows an exemplary case where a user has made a touch operation on one point on the display screen. T1 shown in FIG. 2 conceptually represents the operation location on which the touch operation has been made (to be referred to as the "touch location" hereinafter) and the magnitude of the press-down pressure on the touch location. In this context, the location of the centre of T1 shown in FIG. 2 represents a location on the display screen, on which location the touch operation has been detected by the touch screen, and the area of T1 shown in FIG. 2 corresponds to the magnitude of the press-down pressure. G1 shown in FIG. 2 represents an exemplary barycentric location on the display screen by the touch operation derived from the pressure values from pressure sensors S1-S4 included in the information processing apparatus.

In the following explanation, similarly to T1 in FIG. 2, the reference signs Ts in each of the drawings represent touch locations and the magnitudes of press-down pressures on the touch locations. Furthermore, in the following explanation, similarly to G1 in FIG. 2, the reference signs Gs in each of the drawings represent barycentric locations on the display screen by, touch operations derived from pressure values from the pressure sensors S1-S4 included in the information processing apparatus 100.

As shown in FIG. 2, if a touch operation is made on one point on the display screen by a user, the centre location of T1 at which the touch operation is detected is in correspondence with the barycentric location. In this case, accordingly, the information processing apparatus 100 may suppose the barycentric pressure on the barycentric location as the press-down pressure according to the touch operation.

[b] In Case where User has Made Touch Operation on 2 Points on Display Screen (FIG. 3)

FIG. 3 shows an exemplary case where a user has made a touch operation on two points on the display screen. Besides, the embodiments of the present invention are not limited to the exemplary case shown in FIG. 3, where a user has made a touch operation on two points on the display screen. For example, even if a user has made a touch operation on three or more points on the display screen, the information processing apparatus 100 according to the embodiments of the present invention may estimate the press-down pressures on the touch locations by use of the process related to the estimation approach according to the embodiments of the present invention, which will be described later.

As shown in FIG. 3, if a touch operation is made on two points on the display screen, the information processing apparatus 100 may derive the barycentric location and the barycentric pressure for one point, based upon detection results from the pressure sensors. However, the information processing apparatus 100 is not enabled to acquire press-down pressure on each of the touch locations T2 and T3 directly from the pressure sensors. When a user has made a touch operation on two points on the display screen, the information processing apparatus 100 then estimates the pressure values for the touch locations T2 and T3, based upon the barycentric location (or the barycentric location and the barycentric pressure) derived upon the basis of the detection results from the pressure sensors.

More specifically, the information processing apparatus 100 estimates a press-down pressure on each touch location by the following processes (1) and (2), for example.

(1) Touch Operation Determination Process

Based upon a detection result from the touch screen, the information processing apparatus 100 determines whether a user has made a touch operation on multiple points on the display screen. At this point, the information processing apparatus 100 may include an electrostatic touch screen that functions as a multi touch screen, for example, so that the determination may be made upon the basis of the existence of multiple coordinates at which any changes in the capacitances have been detected on the touch screen.

If it is determined that a change in the capacitance has been detected at one coordinate, the information processing apparatus 100 supposes the barycentric pressure on the barycentric location as a press-down pressure according to the touch operation (corresponding to FIG. 2).

If it is determined that changes in the capacitances have been detected at multiple coordinates, the information processing apparatus 100 then executes the process (2) (Estimation Process).

(2) Estimation Process

If it is determined in the above-described process (1) that changes in the capacitances have been detected at multiple coordinates, the information processing apparatus 100 estimates a press-down pressure on each touch location, based upon the barycentric location (or the barycentric location and the barycentric pressure) derived from the pressure values from the pressure sensors S1-S4, for example.

Figure 4:
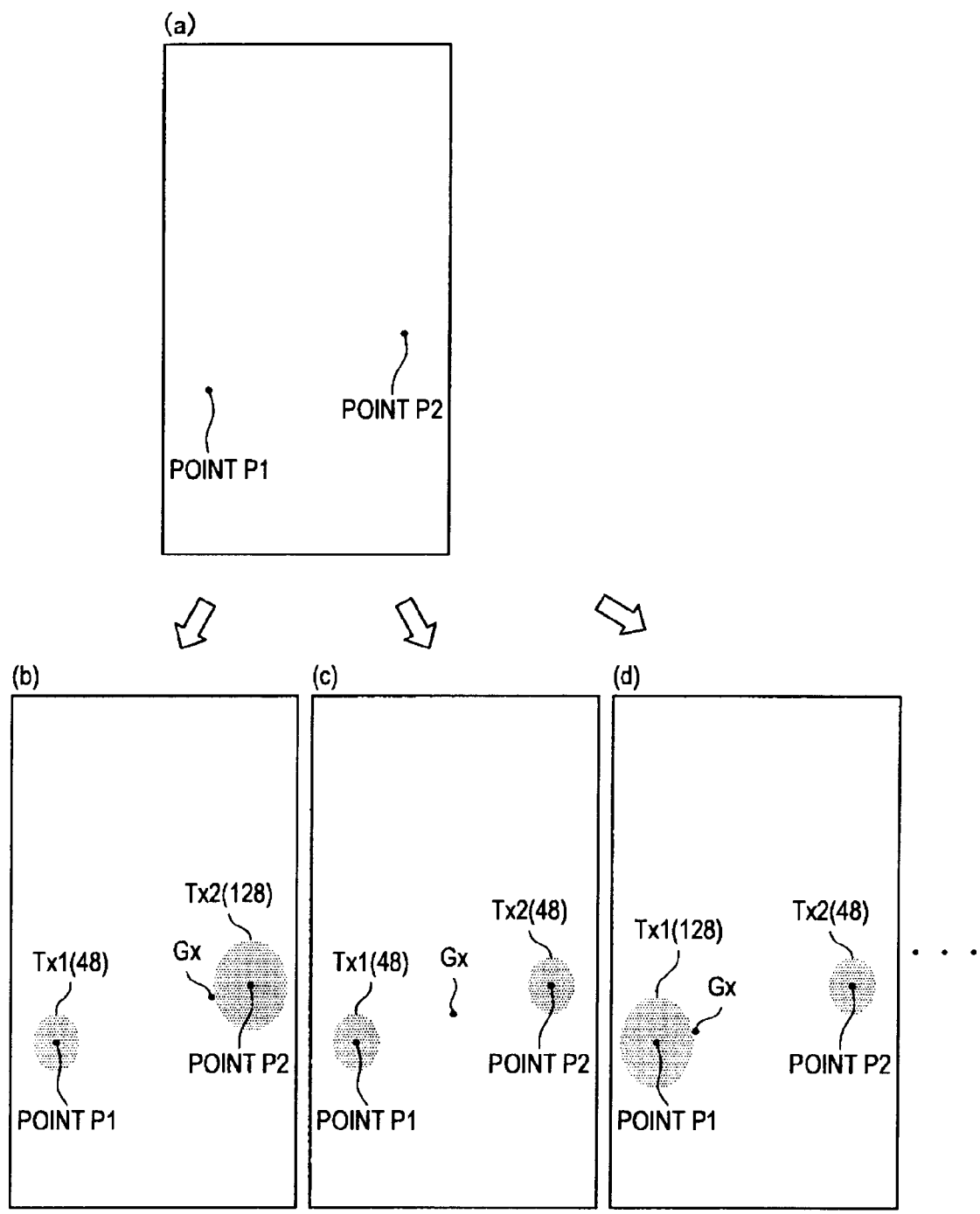
FIG. 4 is an illustration for illustrating the estimation process for an information processing apparatus according to the embodiments of the present invention.

FIG. 4 is an illustration for illustrating the estimation process for the information processing apparatus 100 according to the embodiments of the present invention. FIG. 4 (*a*) shows an example where a touch operation has been made on the points P1 and P2 (i.e., the points P1 and P2 represent touch locations). FIG. 4 (*b*)-FIG. 4(*d*), . . . , show examples of the barycentric location Gx and combination of press-down pressures on touch locations possible for the example of FIG. (a). Besides, in FIG. 4, the barycentric pressure on the barycentric location Gx is not shown, which pressure may be derived by the information processing apparatus 100 by the deriving method to be described later.

As shown in FIG. 4 (*b*)-FIG. 4 (*d*), . . . , the differences between the press-down pressures on the touch locations result in changes of the barycentric location Gx. In the embodiments of the present invention, an estimation result will be given as a combination of the press-down pressures on the touch locations in correspondence with the barycentric location Gx based upon the detection results from the pressure sensors S1-S4.

More specifically, the information processing apparatus 100 estimates a press-down pressure on each touch location by executing the following processes (2-1) and (2-2), for example.

(2-1) Process of Generating Information of Barycentric Location Candidates

The information processing apparatus 100 selectively generates information of barycentric location candidates, in which information the information of combination of pressure values on multiple locations on the display screen is stored in correspondence with the information of the barycentric location. In this context, the information processing apparatus 100 generates the information of barycentric location candidates if no information of barycentric location candidates is stored in a storage unit (to be described later) included in the information processing apparatus 100, for example.

FIG. 5 is an illustration that shows an example of the information of barycentric location candidates according to the embodiments of the present invention. As shown in FIG. 5, for example, candidate values for the press-down pressures on the coordinates of touch locations (in FIG. 5, two points A and B) (an example of information of combination of the pressure values for multiple locations), the barycentric coordinate, and the barycentric pressure (an example of the information of the barycentric location) are stored in the information of barycentric location candidates in correspondence with each other. In this example shown in FIG. 5, the information of barycentric location candidates is divided into FIG. 5 (*a*)-FIG. 5 (*d*) for each combination of touch coordinates, but the information of barycentric location candidates is not limited to this example. Furthermore, the information processing apparatus 100 may store the information of barycentric location candidates, in which information the information is stored in a table format; but any format may be applied.

[Examples of Method of Deriving Barycentric Location and Barycentric Pressure According to Embodiments of Present Invention]

As shown in FIG. 5, in the information of barycentric location candidates selectively generated by the information processing apparatus 100, information of combination of the pressure values for multiple locations on the display screen and the barycentric location and the barycentric pressure (an example of the information of the barycentre) are stored in correspondence with each other. Now, the method of deriving the barycentric location and the barycentric pressure by the information processing apparatus 100 according to the embodiments of the present invention will be described. An example of the method of deriving the barycentric location and the barycentric pressure upon the basis of two points and an example of the method of deriving the barycentric location and the barycentric pressure upon the basis of three points will be described below one by one.

Figure 6:
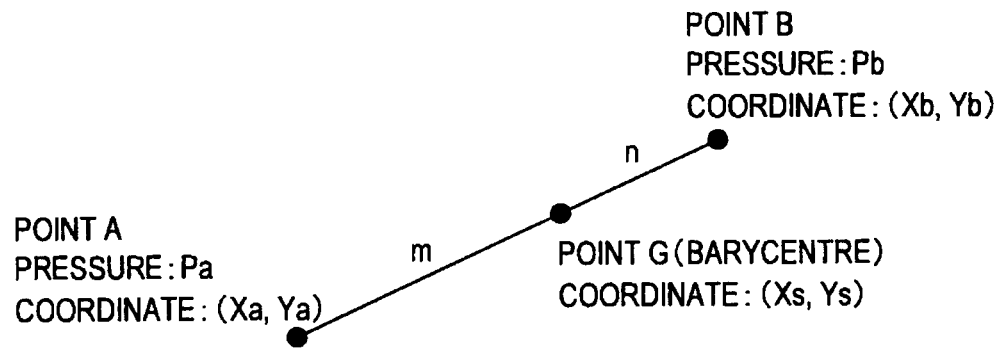
FIG. 6 is the first illustration for illustrating the method of deriving the location and the barycentric pressure according to the embodiments of the present invention.

[i] Example of Method of Deriving Barycentric Location and Barycentric Pressure Upon Basis of 2 Points FIG. 6 is the first illustration for illustrating the method of deriving the barycentric location and the barycentric pressure according to the embodiments of the present invention. In FIG. 6, the information processing apparatus 100 derives the barycentric location and the barycentric pressure, based upon the coordinates and the pressures for two points A and B. There will be described below an example of the method of deriving the barycentric location and the barycentric pressure upon the basis of two points: A and B; the coordinate of the point A is (Xa, Ya) and the pressure value for the point A is Pa; the coordinate of the point B is (Xb, Yb) and the pressure value for the point B is Pb. And hereinafter, the coordinate of the barycentre point G (the barycentric location) is represented by (Xg, Yg) and the pressure value for the point G (the barycentric pressure) is represented by Pg.

Let the internally dividing ratio of the segment AB shown in FIG. 6 be AG:GB=m:n, then m and n are expressed as in Equations 1 and 2 below, respectively:

$$m = Pb/(Pa+Pb) \quad \text{(Equation 1)}$$

$$n = Pa/(Pa+Pb) \quad \text{(Equation 2)}$$

Xg and Yg for the barycentric location are then expressed as in Equations 3 and 4 below, respectively:

$$Xg = (n \cdot Xa + m \cdot Xb)/(m+n) \quad \text{(Equation 3)}$$

$$Yg = (n \cdot Ya + m \cdot Yb)/(m+n) \quad \text{(Equation 4)}$$

Pg representing the barycentric pressure is then expressed as in Equation 5:

$$Pg = (n \cdot Pa + m \cdot Pb)/(m+n) \quad \text{(Equation 5)}$$

The information processing apparatus 100 may derive the barycentric location and the barycentric pressure, respectively, by operating Equation 1-Equation 5 upon the basis of the coordinates and pressures for the points A and B.

Figure 7:
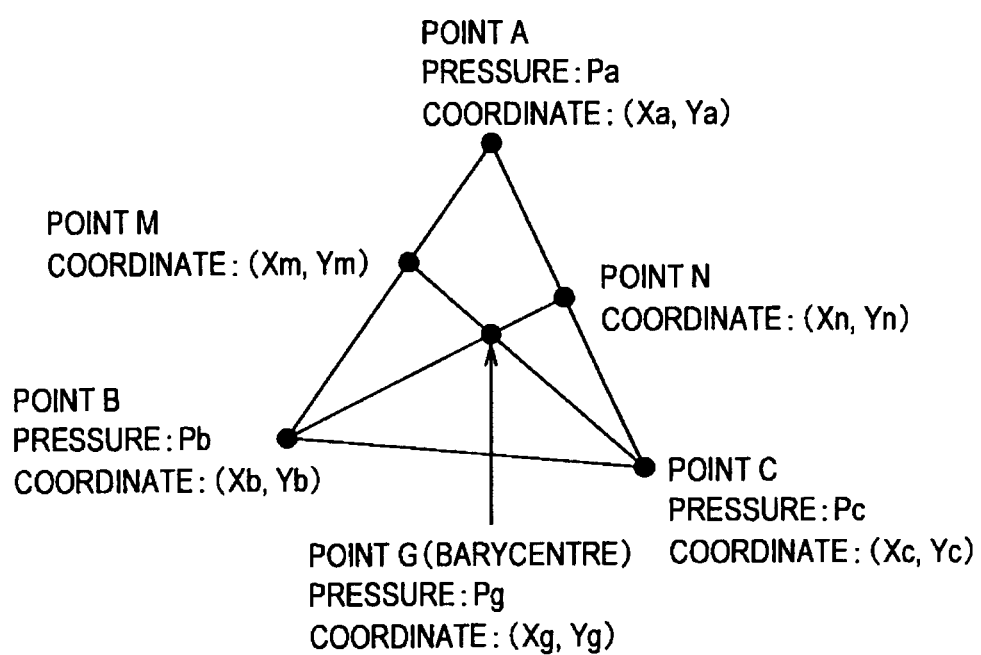
FIG. 7 is the second illustration for illustrating the method of deriving the location and the barycentric pressure according to the embodiments of the present invention.

[ii] Example of Method of Deriving Barycentric Location and Barycentric Pressure upon Basis of 3 Points FIG. 7 is the second illustration for illustrating the method of deriving the barycentric location and the barycentric pressure according to the embodiments of the present invention. In FIG. 7, the information processing apparatus 100 derives the barycentric location and the barycentric pressure, based upon the coordinates and the pressures for three points A, B, and C. There will be described below an example of the method of deriving the barycentric location and the barycentric pressure upon the basis of three points: A, B, and C; the coordinate of the point A is (Xa, Ya) and the pressure value for the point A is Pa; the coordinate of the point B is (Xb, Yb) and the pressure value for the point B is Pb; the coordinate of the point C is (Xc, Yc) and the pressure value for the point C is Pc. Besides, the case where the barycentric location and the barycentric pressure is derived upon the basis of four or more points will not described here, in which case the information processing apparatus 100 executes processes in the same manner for the case where the barycentric location and the barycentric pressure is derived upon the basis of three points.

The information processing apparatus 100 derives the coordinate (Xm, Ym) for the point M on the segment AB and the coordinate (Xn, Yn) for the point N on the segment AC. The coordinate (Xm, Ym) for the point M on the segment AB is derived from the coordinates and pressure values for the points A and B and Equation 1-Equation 5. The coordinate (Xn, Yn) for the point N on the segment AC is derived from the coordinates and pressure values for the points A and C and Equation 1-Equation 5.

The information processing apparatus 100 draw lines to connect the point B to the point N and the point C to the point M, respectively, so as to define the intersection of the lines as the barycentre point G (the barycentric location).

Now, the slope of the line to connect the point B to the point N is given by Equation 6 and the slope of the line to connect the point C to the point M is given by Equation 7, and then the segment BN is expressed as in Equation 8 and the segment CM is expressed as in Equation 9:

$$A1=(Yn-Yb)/(Xn-Xb) \quad \text{(Equation 6)}$$

$$A2=(Ym-Yc)/(Xm-Xc) \quad \text{(Equation 7)}$$

$$y=A1\cdot(x-Xb)+Yb \quad \text{(Equation 8)}$$

$$y=A2\cdot(x-Xc)+Yc \quad \text{(Equation 9)}$$

Thus, because of Equation 6-Equation 9, Xg and Yg for the barycentric location is expressed as in Equation 10 and Equation 11:

$$Xg=(Yc-Yb+A1\cdot Xb-A2\cdot Xc)/(A1-A2) \quad \text{(Equation 10)}$$

$$Yg=A1\cdot(Xg-Xb)+Yb \quad \text{(Equation 11)}$$

Pg representing the barycentric pressure is derived by use of the pressures on the points M and N, Equation 1, Equation 2, and Equation 5, for example.

The information processing apparatus 100 may derive each of the barycentric location and the barycentric pressure by appropriately operating Equation 1-Equation 10 upon the basis of the coordinates and pressures for the points A, B, and C.

The information processing apparatus 100 may derive the barycentric location and the barycentric pressure by use of the above-described deriving methods [1] and [2], for example. Thus, the information processing apparatus 100 may selectively generate information of barycentric location candidates, such as shown in FIG. 5, if no information of barycentric location candidates is stored.

(2-2) Estimation Process

When information of barycentric location candidates is selectively generated in the above-described process (2-1), the information processing apparatus 100 then estimates a press-down pressure on each touch location, based upon the information of barycentric location candidates and upon the barycentric location and the barycentric pressure derived upon the basis of detection results from the pressure sensors.

More specifically, the information processing apparatus 100 estimates that the pressure value for the touch locations is combination of the pressure values with the information of the barycentric location in correspondence with the barycentric location based upon the results detected by the pressure sensors. The information processing apparatus 100 estimates that such a value in correspondence is the equal value or the closest value.

FIG. 8 is an illustration that shows an example of the derivation results of the barycentric location and the barycentric pressure by the information processing apparatus 100 according to the embodiments of the present invention. In FIG. 8, combination of the detection results from the pressure sensors S1-S4 shown in FIG. 1, the barycentric coordinate (an example of the barycentric location), and the barycentric pressure are shown in correspondence with each other. Besides, FIG. 8 shows a plurality of combinations of the detection results from the pressure sensors S1-S4, which are given as a matter of illustration. In other words, the information processing apparatus 100 appropriately derives a barycentric coordinate (an example of the barycentric location) and a barycentric pressure, based upon the detection results from each of the pressure sensors S1-S4 according to a touch operation by a user. Furthermore, the information processing apparatus 100 may derive the barycentric coordinate (an example of the barycentric location) and the barycentric pressure by applying the above-described deriving method [ii].

Figure 9:
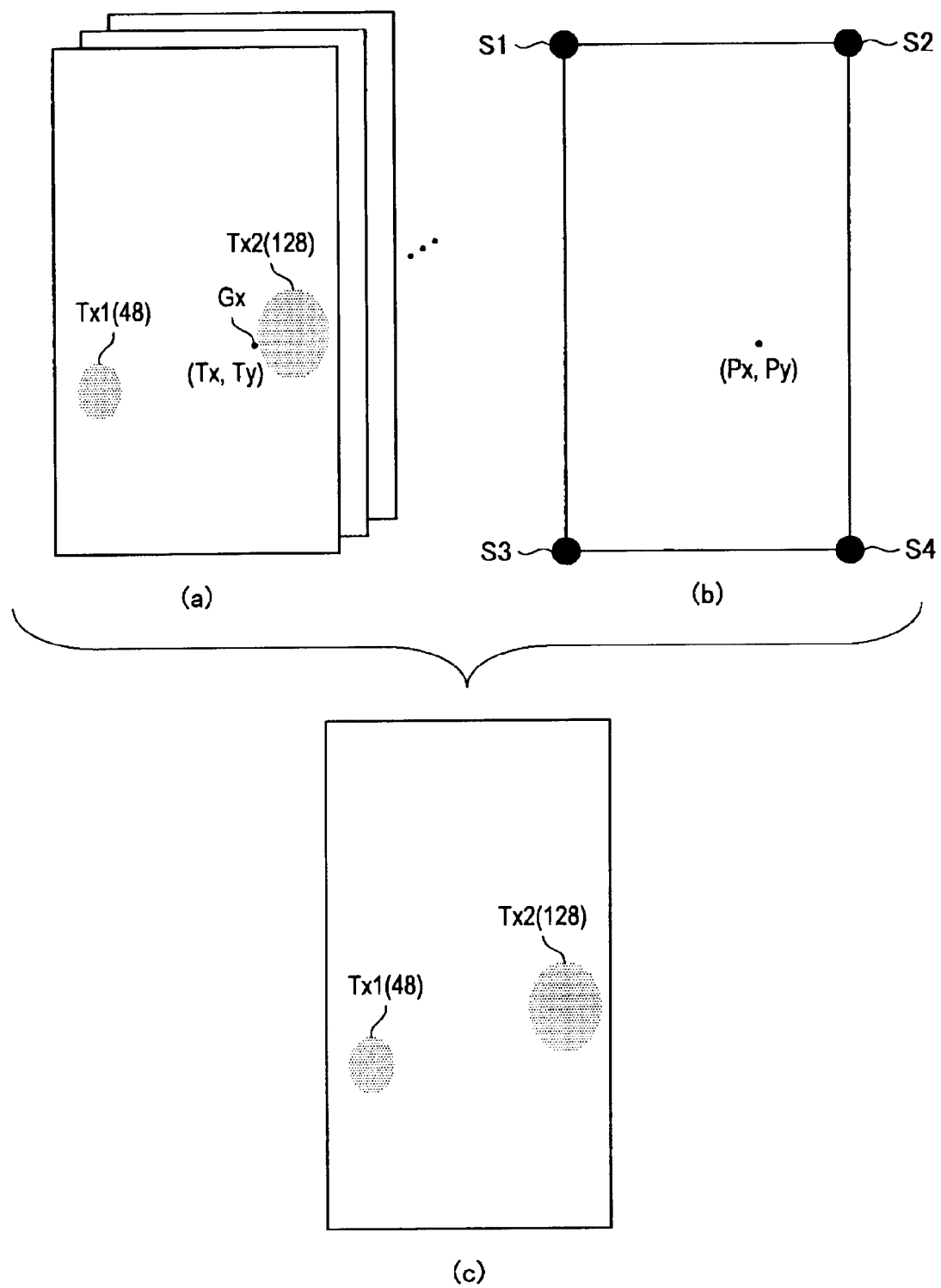
FIG. 9 is an illustration for illustrating the estimation process for an information processing apparatus according to the embodiments of the present invention.

FIG. 9 is an illustration for illustrating the estimation process for the information processing apparatus 100 according to the embodiments of the present invention. FIG. 9 (*a*) conceptually shows combination of pressure values for touch coordinates contained in information of barycentric location candidates. FIG. 9 (*b*) conceptually shows the derived barycentric location. FIG. 9 (*c*) conceptually shows the estimation results from the information processing apparatus 100.

As shown in FIG. 9, the information processing apparatus 100 estimates a press-down pressure on each touch location by matching the information of barycentric location candidates and the derived barycentric location, for example.

The information processing apparatus 100 may estimate a press-down pressure on each touch location, using the further derived barycentric pressure, which is not shown in FIG. 9 (*b*), though. By matching the information of barycentric location candidates and the derived barycentric location and the barycentric pressure, the information processing apparatus 100 may increase the accuracy of the estimation of a press-down pressure on each touch location. Besides, the information used by the information processing apparatus 100 for increasing the accuracy of the estimation of a press-down pressure on each touch location is not limited to the barycentric pressure. For example, in order to further increase the accuracy of the estimation, the information processing apparatus 100 may further use the a detection result from a pressure sensor of the multiple pressure sensors included in the information processing apparatus 100.

The information processing apparatus 100 estimates a press-down pressure on each touch location by executing the processes (2-1) and (2-2), for example. The information processing apparatus 100 estimates that the pressure value for the touch locations is combination of the pressure values with the information of the barycentric location in correspondence with the barycentric location based upon the detection results from the pressure sensors. In other words, the information processing apparatus 100 estimates that a pressure value for each touch location is a value in correspondence with the barycentric location (or the barycentric location and the barycentric pressure) derived from the detection results from a pressure detector 104, which value in correspondence is amongst estimation candidates indicating possible press-down pressure on each touch location. Thus, the information processing apparatus 100 may realise more accurate estimation of a press-down pressure on each touch location, based upon the detection results from the pressure sensors. Consequently, the information processing apparatus 100 may estimate pressure values for multiple operation locations on the display screen corresponding to a user operation.

[Specific Example of Process Related to Estimation Approach According to Embodiments of Present Invention]

Figure 10:
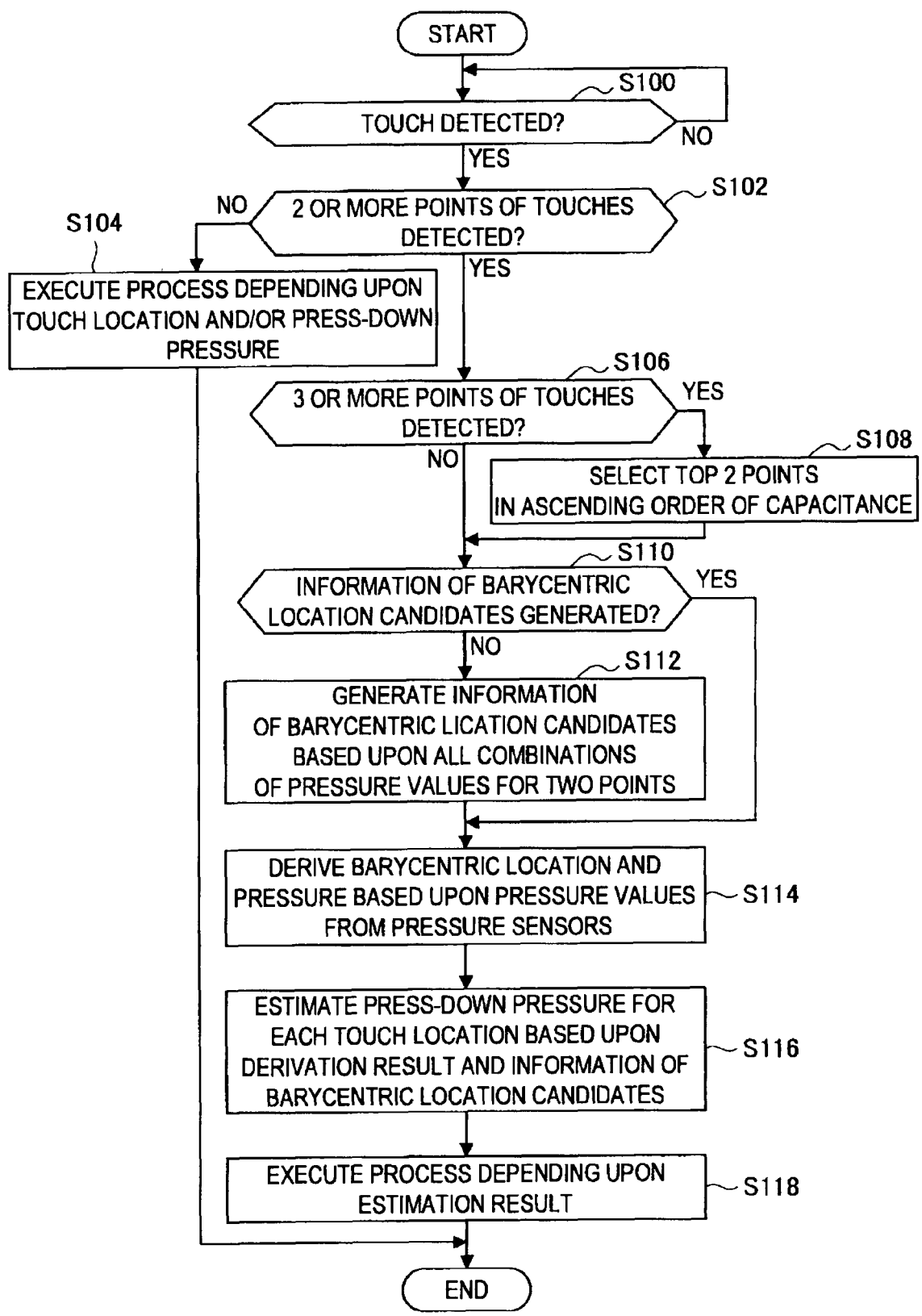
FIG. 10 is an illustration that shows an exemplary process related to the estimation approach for an information processing apparatus according to the embodiments of the present invention.

Next, the process related to the estimation approach according to the embodiments of the present invention will be described more specifically. FIG. 10 is an illustration that shows an exemplary process related to the estimation approach for the information processing apparatus 100 according to the embodiments of the present invention. FIG. 10 shows an exemplary process for the information processing apparatus 100 to derive the barycentric location and the barycentric pressure upon the basis of pressure values from pressure sensors.

The information processing apparatus 100 determines whether any touch (any touch operation of a user) on the display screen has been detected (S100). When the capacitance value changes in the touch screen, the information processing apparatus 100 may determine that there has been a touch detected, but different criterions may be used for the determination. If it is not determined in step S100 that there has been a touch detected, the information processing apparatus 100 will not proceed with the process.

If it is determined in step S100 that there has been a touch detected, the information processing apparatus 100 determines whether there have been two or more touches detected (S102). The information processing apparatus 100 may determine that there have been two or more touches detected if there have two or more spots whose capacitances have changed on the touch screen, for example; but different criterions may be used for the determination.

In this context, the processes of steps S100 and S102 shown in FIG. 10 correspond to the above-described process (1) (Process of Determining Touch Operation).

If it is not determined in step S102 that there have been two or more touches detected, the information processing apparatus 100 execute a process depending upon the touch locations and/or the press-down pressures (S104).

If it is determined in step S102 that there have been two or more touches detected, the information processing apparatus 100 determines whether there have been three or more touches detected (S106). The information processing apparatus 100 may determine that there have been three or more touches detected if there have been three or more spots whose capacitances have been changed in the touch screen, for example; but different criterions may be used for the determination.

If it is determined in step S106 that there have been three or more touches detected, the information processing apparatus 100 selects top two points in the ascending order of capacitance (S108). The information processing apparatus 100 then executes the process of step S110, which is to be described later Besides, in the example shown in FIG. 10, the information processing apparatus 100 selects the two points, and estimates the press-down pressures for the touch locations of the selected two points, but more than two points may be handled. For example, the information processing apparatus 100 may estimate press-down pressures on three or more touch locations by use of the deriving method presented in [ii] described above.

If it is not determined in step S106 that there have been three or more touches detected, or if the process of step S108 has been executed, the information processing apparatus 100 determines whether information of barycentric location candidates has been generated (S110). If no information of barycentric location candidates is stored in a storage unit (to be described later), for example, the information processing apparatus 100 may determine that no information of barycentric location candidates has been generated, but different criterions may be used for the determination. For example, the information processing apparatus 100 may determine that no information of barycentric location candidates has been generated if no information of barycentric location candidates is stored in a predetermined place for storing, for example, in an external recording medium, such as a memory stick, or in an external apparatus connected to the information processing apparatus 100 via a network (or directly), or in the like.

If it is not determined in step S110 that information of barycentric location candidates has been generated, the information processing apparatus 100 generates information of barycentric location candidates, such as shown in FIG. 5, based upon all combinations of the pressure values for the two points corresponding to the touch locations (S112). The information processing apparatus 100 then stores the generated information of barycentric location candidates in a predetermined place for storing, such as the storage unit (to be described later).

In this context, the processes of steps S110 and S112 shown in FIG. 10 correspond to the above-described process (2-1) (Process of Generating Information of Barycentric Location Candidates).

If it is determined in step S110 that information of barycentric location candidates has been generated, or if information of barycentric location candidates has been generated in step S112, the information processing apparatus 100 derives the barycentric location and the barycentric pressure, based upon the pressure values from the pressure sensors (S114).

Besides, in the example shown in FIG. 10, the process of step S114 follows the processes of steps S106-S112, but the order is not limited thereto. For example, the information processing apparatus 100 may execute the processes of steps S106-S112 and the process of step S114 independently.

The information processing apparatus 100 estimates the press-down pressure for each touch locations, based upon the derivation results derived in step S114 and the information of barycentric location candidates (S116). In this context, the process of step S116 shown in FIG. 10 corresponds to the above-described process (2-2) (Estimation Process).

When the press-down pressure for each touch location has been estimated in step S116, the information processing apparatus 100 then executes a process depending upon the estimation results (S118).

<Exemplary Process Depending upon Estimation Results According to Embodiments of Present Invention>

Figure 11:
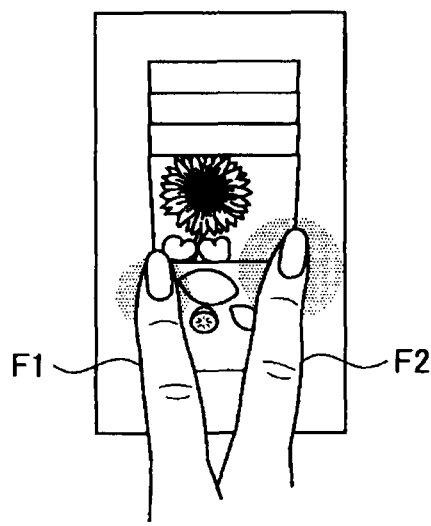
FIG. 11 is an illustration that shows an exemplary process depending upon the estimation results for an information processing apparatus according to the embodiments of the present invention.
Figure 12:
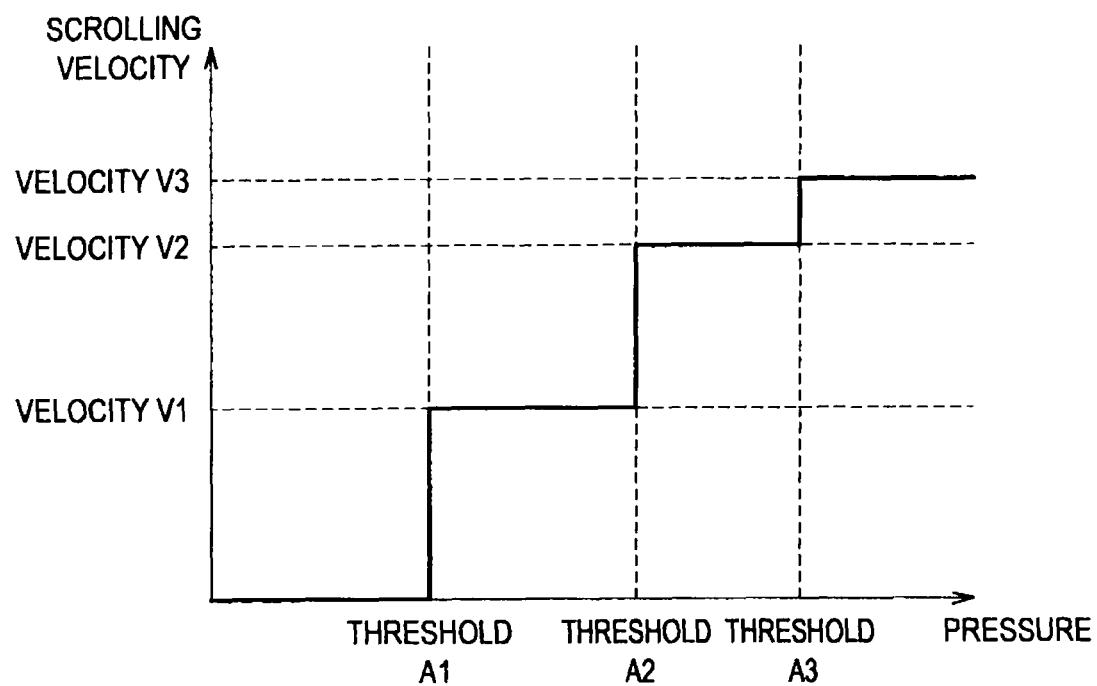
FIG. 12 is an illustration that shows an exemplary process depending upon the estimation results for an information processing apparatus according to the embodiments of the present invention.

FIG. 11 and FIG. 12 are illustrations that show an exemplary process depending upon the estimation results for the information processing apparatus 100 according to the embodiments of the present invention. In the example shown in FIG. 11, multiple sheets of image are arranged on the display screen successively along the perspective direction towards the back, and a group of the images will be scrolled in the perspective direction towards the front or the back, just like flipping pages of a book, for example, according to touch operations produced by the two fingers (F1/F2) of a user.

If the estimated press-down pressure produced by the finger F1 is larger than the estimated press-down pressure produced by the finger F2, the information processing apparatus 100 makes a scroll in the perspective direction towards the front. On the other hand, if the estimated press-down pressure produced by the finger F2 is larger than the estimated press-down pressure produced by the finger F1, the information processing apparatus 100 makes a scroll in the perspective direction towards the back.

Furthermore, the information processing apparatus 100 sets the scrolling speed to change gradually in dependence upon the estimated press-down pressure as shown in FIG. 12, for example, based upon the larger pressure value of the estimated press-down pressures and upon predetermined thresholds A1-A3 as shown in FIG. 12.

The process depending upon the estimation results shown in step S118 in FIG. 10 would mean that the process may be changed upon the basis of the estimated press-down pressure as shown in FIG. 12, for example. Besides, the process depending upon the estimation results according to the embodiments of the present invention is not limited thereto. For example, the information processing apparatus 100 may execute a predetermined process, such as a stop of reproduced content data (video/audio), if the estimated press-down pressure produced by the finger F1 is equal to the estimated press-down pressure produced by the finger F2 (or if the absolute value of their difference is equal to or below a predetermined value). Furthermore, a user may set the process based upon the estimated press-down pressure for the information processing apparatus 100 to a desired process.

By executing the process shown in FIG. 10, for example, the information processing apparatus 100 may realise the above-described processes (1) (Process of Determining Touch Operation) and (2) (Estimation Process) related to the estimation approach. Accordingly, the information processing apparatus 100 may estimate the pressure value for each of the multiple operation locations on the display screen corresponding to a user operation.

(Information Processing Apparatus According to Embodiments of Present Invention)

Next, an exemplary arrangement of the information processing apparatus 100 according to the embodiments of the present invention, which can realise the estimation approach according to the embodiments of the present invention.

Figure 13:
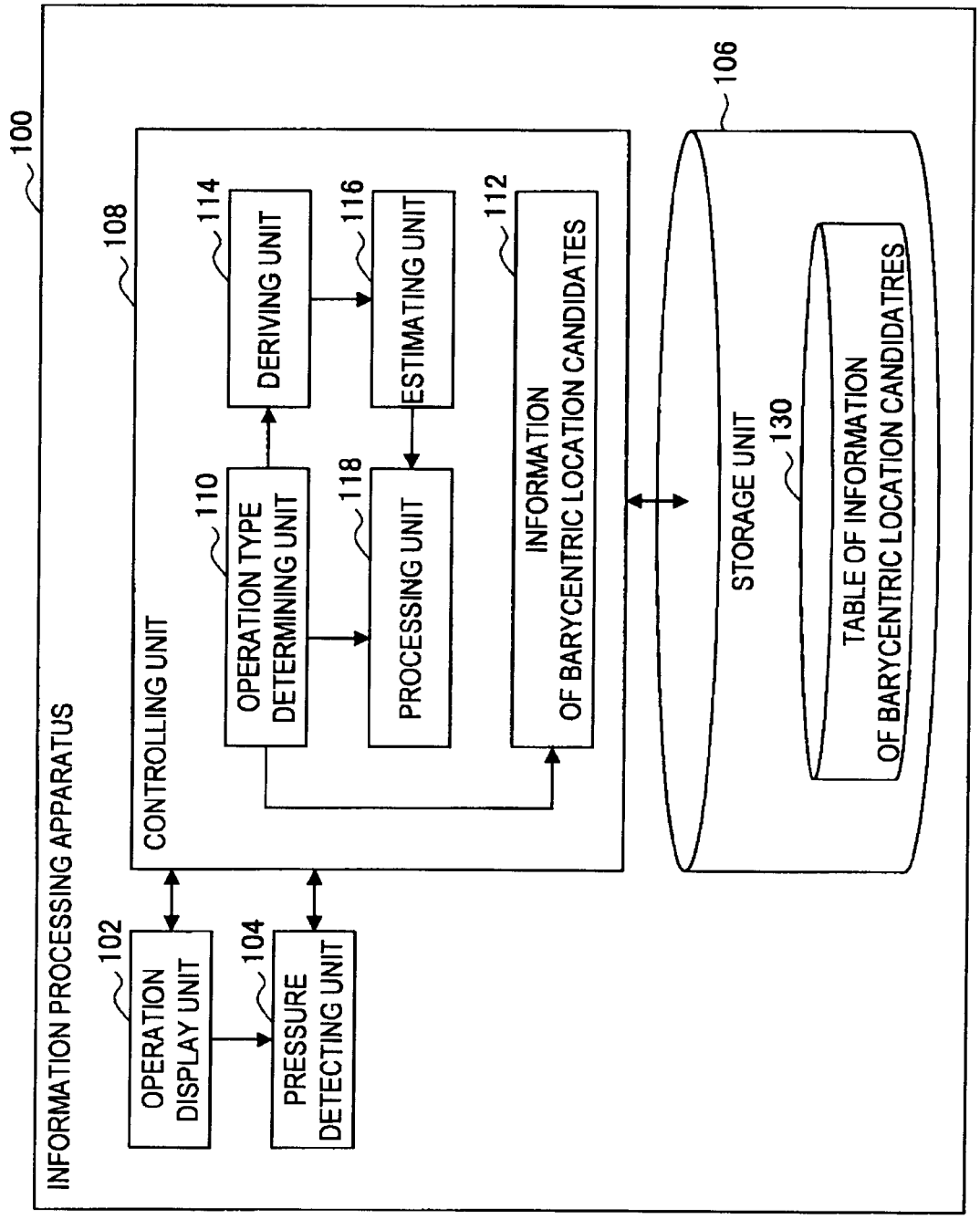
FIG. 13 is an illustration that shows an exemplary arrangement of an information processing apparatus according to the embodiments of the present invention.

FIG. 13 is an illustration that shows an exemplary arrangement of the information processing apparatus 100 according to the embodiments of the present invention. The information processing apparatus 100 includes an operation display unit 102, a pressure detecting unit 104, a storage unit 106, and a controlling unit 108.

The information processing apparatus 100 may further include, for example, a ROM (Read Only Memory: not shown), a RAM (Random Access Memory: not shown), a communication unit (not shown), an operation unit (not shown) for enabling user operations, etc. The information processing apparatus 100 connects the components to each other by a bus as a channel for data, for example.

In this context, data for control, such as programs and operation parameters for use by the controlling unit 108, is stored in the ROM (not shown). Programs to be executed by the controller 108 or the like are stored primarily in the RAM (not shown). The operation unit (not shown) may be, for example, the operation input device, which is to be described later. The communication unit (not shown) takes a role of making a wired/wireless communication with an external apparatus via a network (or directly). For example, such network may be a wired network, such as a LAN (Local Area Network) or a WAN (Wide Area Network), or may be a wireless network, such as a wireless WAN (WWAN) or a wireless MAN (WMAN: Wireless Metropolitan Area Network) through base stations, or may be the Internet under some communication protocol, such as the TCP/IP (Transmission Control Protocol/Internet Protocol), but it is not limited thereto. The communication unit (not shown) may be, for example, the communication interface, which is to be described later.

[Exemplary Hardware Arrangement of Information Processing Apparatus 100]

Figure 14:
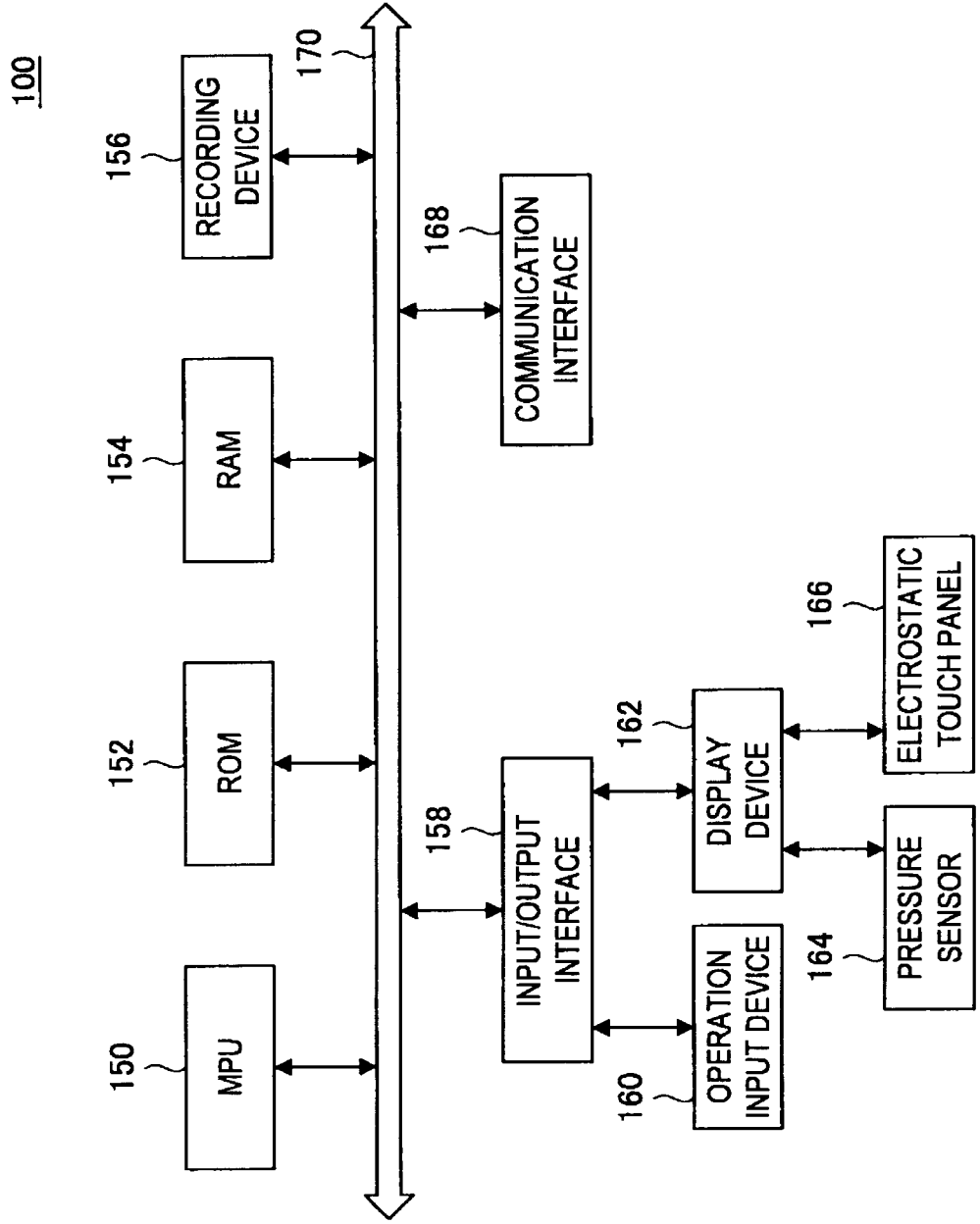
FIG. 14 is an illustration that shows an exemplary hardware arrangement of an information processing apparatus according to the embodiments of the present invention.

FIG. 14 is an illustration that shows an exemplary hardware arrangement of the information processing apparatus 100 according to the embodiments of the present invention. In FIG. 14, for example, the information processing apparatus 100 includes an MPU 150, a ROM 152, a RAM 154, a recording medium 156, an input/output interface 158, an operation input device 160, a display device 162, a pressure sensor 164, an electrostatic touch panel 166, and a communication interface 168. Furthermore, the information processing apparatus 100 connects the components to each other by a bus 170 as a channel for data, for example.

The MPU 150 includes a MPU (Micro Processing Unit), a integrated circuit in which a plurality of circuits are integrated for realising the control functions, and the like, and functions as the controlling unit 108 for controlling the entire information processing apparatus 100. Furthermore, in the information processing apparatus 100, the MPU 150 may take roles of the operation type determining unit 110, the information of barycentric location candidates generating unit 112, the deriving unit 114, an estimating unit 116, and the processing unit 118, which are to be described later.

Data for control, such as programs and operation parameters for use by the MPU 150, is stored in the ROM 152, and, for example, programs to be executed by the MPU 150 or the like are primarily stored in the RAM 154.

The recording medium 156 functions as the storage unit 106, and various data is stored therein, for example, information (data) of the barycentric location candidates, content data, applications, etc. The recording medium 156 may be a magnetic recording medium, such as a hard disk, or a nonvolatile memory, such as an EEPROM (Electrically Erasable and Programmable Read Only Memory), a flash memory, an MRAM (Magnetoresistive Random Access Memory), an FeRAM (Ferroelectric Random Access Memory), or a PRAM (Phase change Random Access Memory), for example, but it is not limited thereto.

The input/output interface 158 is connected to the operation input device 160 and the display device 162, for example. The input/output interface 158 may be a USB (Universal Serial Bus) terminal, a DVI (Digital Visual Interface) terminal, an HDMI (High-Definition Multimedia Interface) terminal, or a processing circuit of all kinds, for example, but it is not limited thereto. Besides, it should be understood that the input/output interface 158 may be connected to an operation input device (e.g., a keyboard or a mouse) or a display device (e.g., an external display) as an apparatus external to the information processing apparatus 100.

The operation input device 160 functions as the operation unit (not shown). The operation input device 160 is provided on the information processing apparatus 100, and connected to the input/output interface 158 inside the information processing apparatus 100. For example, the operation input device 160 may be buttons, a direction key, a rotary selector, such as a jog dial, or any combinations thereof, but it is not limited thereto.

The display device 162 functions as the operation display unit 102, as well as the electrostatic touch panel 166. For example, the display device 162 is provided on the information processing apparatus 100, and connected to the input/output interface 158 inside the information processing apparatus 100. For example, the display device 162 may be a liquid crystal display (LCD), an organic electroluminescence display (which may be otherwise called OLED (Organic Light Emitting Diode) display), or the like, but it is not limited thereto.

Also provided on the display device 162 are a pressure sensor 164 for detecting a pressure according to a touch operation and taking a role of the pressure detecting unit 104 and an electrostatic touch panel 166 enabled to detect one or more touch operations made by a user. Arranged to include the display device 162, the pressure sensor 164, and the electrostatic touch panel 166, the touch screen according to the embodiments of the present invention is realised to be able to detect both user operations and pressures.

<Arrangement Examples of the Operation Display Unit 102 and the Pressure Detecting Unit 104>

Figure 15:
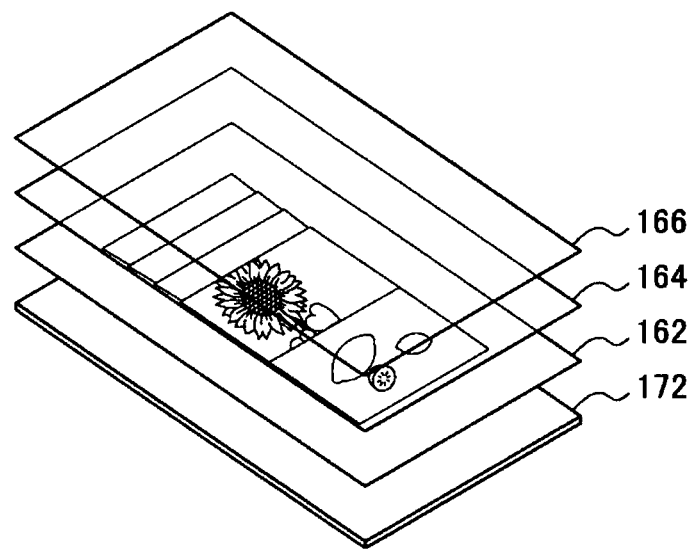
FIG. 15 is an illustration that shows an example of part of the hardware arrangement of an information processing apparatus according to the embodiments of the present invention.

FIG. 15 is an illustration that shows an example of part of the hardware arrangement of the information processing apparatus 100 according to the embodiments of the present invention. FIG. 15 mainly shows arrangement examples of the operation display unit 102 and the pressure detecting unit 104 shown in FIG. 13.

The information processing apparatus 100 realises the operation display unit 102 and the pressure detecting unit 104 by a hardware arrangement in which the display device 162, the pressure sensor 164, and the electrostatic touch panel 166 are built up on a substrate 172 including the MPU 150, the ROM 152, etc. Besides, the arrangements of the operation display unit 102 and the pressure detecting unit 104 included in the information processing apparatus 100 according to the embodiments of the present invention is not limited to the example shown in FIG. 15.

In reference to FIG. 14 again, the exemplary hardware arrangement of the information processing apparatus 100 will described. The communication interface 168 is communication means included in the information processing apparatus 100, and functions as the communication unit (not shown) for wired/wireless communication with an external apparatus via a network (or directly). For example, the communication interface 168 may be a communication antenna and an RF circuit (for wireless communication), an IEEE 802. 15. 1 port and a transceiver circuit (for wireless communication), a LAN terminal and a transceiver circuit (for wired communication), or the like pairs, but it is not limited thereto.

Arranged as shown in FIG. 14, for example, the information processing apparatus 100 executes the above-described processes (1) (Process of Determining Touch Operation) and (2) (Estimation Process) to realise the estimation approach according to the embodiments of the present invention.

Besides, the hardware arrangement of the information processing apparatus 100 according to the embodiments of the present invention is not limited to the arrangement shown in FIG. 14. For example, the information processing apparatus 100 according to the embodiments of the present invention may include a touch panel in a given format which can realise a multi touch screen instead of the electrostatic touch panel 166. For example, the information processing apparatus 100 according to the embodiments of the present invention may further include a slot or the like for holding a removable external recording medium, such as a memory stick or the like, in which information of barycentric location candidates can be stored.

In reference to FIG. 13 again, the components of the information processing apparatus 100 will be described. The operation display unit 102 displays the display screen, and detects a touch location on the display screen upon the basis of a user operation on the display screen. The operation display unit 102 then sends to the controlling unit 108 information of the coordinate that represents a touched place on the display screen as a detection result, for example. Besides, the detection result from the operation display unit 102 is not limited to such information of the coordinate that represents a touched place on the display screen, and it may contain information of the capacitance value for the touch location, for example.

The pressure detecting unit 104 detects a pressure according to a touch operation made by a user on the display screen of the operation display unit 102. The pressure detecting unit 104 includes pressure sensors provided for every four corner of the display screen as shown in FIG. 1, for example, to detect pressures according to the touch operation with the pressure sensors. Besides, it should be understood that the number of the pressure sensors included in the pressure detecting unit 104 and their location to be provided on is not limited to the example shown in FIG. 1.

The pressure detecting unit 104 sends to the controlling unit 108 the detection results from the pressure sensors according to the touch operation, for example. Besides, the information sent to the controlling unit 108 by the pressure detecting unit 104 is not limited to the detection results from the pressure sensors. For example, the pressure detecting unit 104 may have a function to derive the barycentric location and the barycentric pressure on the basis of the detection results from the pressure sensors and to send the derivation results to the controlling unit 108.

In this context, in the information processing apparatus 100 the operation display unit 102 and the pressure detecting unit 104 are arranged to include the display device 162, the pressure sensor 164, and the electrostatic touch panel 166, for example, but they may be arranged differently.

The storage unit 106 is storage means included in the information processing apparatus 100. For example, the storage unit 106 may be a magnetic recording medium, such as a hard disk, or a non-volatile memory, such as a frash memory, but it is not limited thereto.

Various data is stored in the storage unit 106, for example, information (data) of barycentric location candidates, content data, applications, etc. In the example shown in FIG. 13, a table of information of barycentric location candidates 130 (an example of information of barycentric location candidates) is stored in the storage unit 106, but any other data may be stored therein.

For example, the controlling unit 108 includes an integrated circuit in which various processing circuits are integrated and the like, and takes a role of controlling the entire information processing apparatus 100. The controlling unit 108 further includes the operation type determining unit 110, the information of barycentric location candidates generating unit 112, the deriving unit 114, the estimating unit 116, and the processing unit 118, and takes an initiative role of executing the above-described processes (1) (Process of Determining Touch Operation) and (2) (Estimation Process).

The operation type determining unit 110 takes a role of executing the above-described process (Process of Determining Touch Operation). More specifically, the operation type determining unit 110 determines the type of a user operation, based upon the detection results from the operation display unit 102. The types of user operations to be determined by the operation type determining unit 110 may be a first operation type corresponding to the case where multiple touch location (operation locations) have been detected by the operation display unit 102 and a second operation type corresponding to the case where a single touch location has been detected.

The operation type determining unit 110 then sends the determination results to each of the information of barycentric location candidates generating unit 112, the deriving unit 114, and the processing unit 118.

Besides, just by way of example only, the operation type determining unit 110 according to the embodiments of the present invention is arranged to send any of the determination results to each of those as described above. For example, depending upon the determination results, the operation type determining unit 110 according to the embodiments of the present invention may change the destinations to send the determination results. In this case, if the operation type determining unit 110 determines that the touch operation is the first operation type, for example, then it sends the determination results indicating the first operation type to the information of barycentric location candidates generating unit 112 and to the deriving unit 114 selectively. On the other hand, if the operation type determining unit 110 determines that the touch operation is the second operation type, for example, then it sends the determination results indicating the second operation type to the processing unit 118. In the main example to be described below, the operation type determining unit 110 sends any of the determination results to each of those.

The information of barycentric location candidates generating unit 112 takes a role of executing the process (2-1) of the above-described process (2), and selectively generates information of barycentric location candidates. More specifically, the information of barycentric location candidates generating unit 112 generates information of barycentric location candidates if a determination result indicating the first operation type from the operation type determining unit 110, and if no information of barycentric location candidates is stored in the storage unit 106, for example.

If a determination result indicating the first operation type is sent from the operation determining unit 110, the deriving unit 114 derives the barycentric location (or the barycentric location and the barycentric pressure), based upon the detection results sent from the pressure detecting unit 104. The deriving unit 114 then sends the derivation result to the estimating unit 116.

If a determination result indicating the second operation type is sent from the operation determining unit 110, the deriving unit 114 will not derive the barycentric location (or the barycentric location and the barycentric pressure). When a determination result indicating the second operation type is sent, the determination result indicates that a user has touched only one point, and the touch location corresponds to the barycentric location, as shown in FIG. 2, for example. Furthermore, in this case, the information processing apparatus 100 may suppose the barycentric pressure on the barycentric location as a press-down pressure according to the touch operation. Thus, the deriving unit 114 will not derive the barycentric location (or the barycentric location and the barycentric pressure) because the press-down pressure is not necessarily estimated in this case.

As described above, by the deriving unit 114 executing a processing for deriving the barycentric location (or the barycentric location and the barycentric pressure) upon the basis of detection results sent from the operation determining unit 110, the information processing apparatus 100 may reduce the necessary power consumption for the process related to the estimation approach. Besides, it should be understood that the deriving unit 114 according to the embodiments of the present invention can derive the barycentric location (or the barycentric location and the barycentric pressure), regardless of the determination results sent from the operation determining unit 110.

The estimating unit 116 takes a role of executing the process (2-2) (Estimation Process) of the above-described process (2), and estimates a pressure value (press-down pressure) for each touch location, based upon the derivation result sent from the deriving unit 114 and upon the information of barycentric location candidates stored in the storage unit 106, for example. More specifically, the estimating unit 116 estimates that the pressure values (press-down pressures) for the touch locations are combination of the pressure values in correspondence with the derivation result from the deriving unit 114 based upon the detection results from the pressure sensors amongst combinations of the pressure values recorded in the information of barycentric location candidates, for example.

The estimating unit 116 then sends to the processing unit 118, as an estimation result, information in which each of the estimated press-down pressures are in correspondence with each touch location.

Based upon the determination results from the operation type determining unit 110, the processing unit 118 executes a process depending upon the detection results from the operation display unit 102 and/or the pressure detecting unit 104, or a process depending upon the detection results from the operation display unit 102 and/or the estimation results from the estimating unit 116.

More specifically, if a determination result indicating the first operation type is sent from the operation type determining unit 110, the processing unit 118 executes a process depending upon the multiple touch locations detected by the operation display unit 102 and/or the estimation result sent from the estimating unit 116. In this context, the process of the processing unit 118 in the case where a determination result indicating the first operation type from the operation type determining unit 110 corresponds to the process of step S118 shown in FIG. 10. For example, the process depending upon the estimation result may be the process related to scrolling described in reference to FIG. 11 and FIG. 12, but it is not limited thereto.

If a determination result indicating the second operation type is sent from the operation type determining unit 110, the processing unit 118 executes a process depending upon one touch location detected by the operation display unit 102 and/or the press-down pressure based upon the detection results from the pressure detecting unit 104. In this context, the process of the processing unit 118 in the case where the determination result indicating the second operation type is sent from the operation type determining unit 110 corresponds to the process of step S104 shown in FIG. 10.

Arranged to include the operation type determining unit 110, the information of barycentric location candidates generating unit 112, the deriving unit 114, the estimating unit 116, and the processing unit 118, the controlling unit 108 may take an initiative role of executing the above-described processes (1) (Process of Determining Touch Operation) and (2) (Estimation Process). Furthermore, arranged so, the controlling unit 108 may realise the process depending upon the estimation result if there have been multiple touch locations detected.

Arranged as shown in FIG. 13, for example, the information processing apparatus 100 may realise the above-described processes (1) (Process of Determining Touch Operation) and (2) (Estimation Process). Thus, the information processing apparatus 100 may estimate the pressure values for multiple operation locations on the display screen according to a user operation.

As described above, by the above-described process (1) (Process of Determining Touch Operation), the information processing apparatus 100 according to the embodiments of the present invention determines whether a user has made touch operations on multiple location on the display screen. If the information processing apparatus 100 determines that the user has made multiple touch operations, then it estimates the press-down pressures for the touch locations by the above-described operation (2) (Estimation Process). At this point, the information processing apparatus 100 estimates that the pressure values for the touch locations are combinations of pressure values in correspondence with the derivation result from the deriving unit 114 based upon the detection results from the pressure sensors amongst the combinations of the pressure values recorded in the information of barycentric location candidates. In other words, the information processing apparatus 100 estimates that the pressure values for the touch locations are values in correspondence with the barycentric location (the barycentric location and the barycentric pressure) derived from the detection result from the pressure detecting unit 104 out of the estimation candidates indicating possible press-down pressures on the touch locations.

Accordingly, the information processing apparatus 100 may realise the more accurate estimation of the press-down pressures on the touch locations, based upon the detection results from the pressure sensors included in the pressure detecting unit 104. Thus, the information processing apparatus 100 may estimate the pressure values for the multiple operation locations on the display screen corresponding to the user operation.

Furthermore, the information processing apparatus 100 estimates a press-down pressure, based upon detection results from the pressure sensors included in the pressure detecting unit 104. Accordingly, the information processing apparatus 100 may control the number of the pressure sensors included in the information processing apparatus 100 to be the minimum number (e.g., three or four) for identifying the barycentric location on the plane including the display screen. Thus, the information processing apparatus 100 according to the embodiments of the present invention may further reduce the cost for the devices.

Furthermore, the information processing apparatus 100 can execute a corresponding predetermined process depending upon an estimation result if there have been multiple touch locations detected. Thus, in the information processing apparatus 100, for example, a multi press UI (User Interface) is realised, which can cause the information processing apparatus 100 to make a desired operation by a user changing, at a free timing, the press-down pressure and/or the number of pressing down the display screen.

Further, the user who uses the information processing apparatus 100 can cause the information processing apparatus 100 to make a desired operation according to the press-down pressure and/or the number of pressing down the display screen, with the information processing apparatus 100 put in a bag or a pocket. Thus, the information processing apparatus 100 may improve the convenience for the user.

As described above, the information processing apparatus 100 has been described as an embodiment of the present invention, but the embodiments of the present invention are not limited to the above embodiment. The embodiments of the present invention may be applied to various machines, such as a PC (personal Computer), a computer like a laptop PC, a portable communication apparatus like a mobile phone or PHS (Personal Handy phone System), a video/audio reproducing apparatus like a WALK MAN (registered trademark), a portable game machine like PlayStation Portable (registered trademark), a television set which is receivable the digital broadcasting/analogue broadcasting.

(Program According to Information Processing Apparatus of Embodiments of Present Invention)

By programs for cause a computer to function as a information processing apparatus according to the embodiments of the present invention, the pressure values for multiple locations on the display screen corresponding to a user operation may be estimated.

It should be understood by those skilled in the art that various modifications, combinations, sub-combinations and alterations may occur depending on design requirements and other factors insofar as they are within the scope of the appended claims or the equivalents thereof.

For example, in the information processing apparatus 100 shown in FIG. 13, the controlling unit 108 is arranged to include the operation type determining unit 110, the information of barycentric location candidates generating unit 112, the deriving unit 114, the estimating unit 116, and the processing unit 118, but a information processing apparatus according to the embodiments of the present invention may be arranged differently. For example, an information processing apparatus according to the embodiments of the present invention may include separately the operation type determining unit 110, the information of barycentric location candidates generating unit 112, the deriving unit 114, the estimating unit 116, and the processing unit 118 shown in FIG. 13 (for example, each of them will be implemented in a separate processing circuit).

Moreover, although the programs (computer programs) for cause a computer to function as an information processing apparatus according to the embodiments of the present invention have been only described above, the embodiments of the present invention may also provide a storage medium in which each of the above programs stored.

It should be appreciated that the arrangements described above only represent exemplary embodiments of the present invention, and that the arrangements are embraced in the technical scope of the present invention.

The present application contains subject matter related to that disclosed in Japanese Priority Patent Application JP 2009-091305 filed in the Japan Patent Office on Apr. 3, 2009, the entire content of which is hereby incorporated by reference.

What is claimed is:

1. An information processing apparatus comprising:
an operation display unit for displaying a display screen and detecting a plurality of operation locations on the display screen based upon a user operation on the display screen;
a pressure detecting unit including a plurality of pressure sensors for detecting a pressure value according to the user operation on the operation display unit for each of the plurality of pressure sensors;
an operation type determining unit for determining a type of the user operation, based upon a detection result from the operation display unit;
a deriving unit for selectively deriving a barycentric location on the display screen based upon detection results from the plurality of pressure sensors, based upon a determination result from the operation type determining unit; and
an estimating unit for estimating a pressure value associated with each detected operation location, based upon a derivation result from the deriving unit and upon information of barycentric location candidates in which information of a combination of pressure values on a plurality of locations on the display screen is recorded in correspondence with information of the barycentric location,
wherein the estimating unit estimates a respective pressure value associated with each individual one of the detected operation locations, and
wherein the pressure value detected by the pressure detecting unit is a same magnitude as a sum of all estimated pressure values.

2. The information processing apparatus according to claim 1, wherein the pressure values estimated by the estimating unit are a selected combination of pressure values that is selected from amongst combinations of pressure values recorded in the information of barycentric location candidates, by which the information of the barycentric location is in correspondence with the barycentric location derived by the deriving unit.

3. The information processing apparatus according to claim 2,
wherein the deriving unit also derives a pressure value on the barycentric location, and wherein the pressure values are estimated by the estimating unit based upon a derived result from the deriving unit and upon the information of barycentric location candidates in which information of the pressure value on the barycentric location is recorded in further correspondence with the information of the barycentric location.

4. The information processing apparatus according to claim 1, further comprising:
a processing unit for executing a process depending upon the detection result from the operation display unit and/or a detection result from the pressure detecting unit or a process depending upon the detection result from the operation display unit and/or an estimation result from the estimating unit, based upon the determination result from the operation type determining unit.

5. The information processing apparatus according to claim 1, further comprising:
a storage unit in which the information of barycentric location candidates can be stored; and
an information of barycentric location candidates generating unit for selectively generating the information of barycentric location candidates,
wherein the information of barycentric location candidates generating unit generates the information of barycentric location candidates if a determination result indicating a first operation type corresponding to a case where the plurality of operation locations have been detected by the operation display unit is sent from the operation type determining unit and if no information of barycentric location candidates is stored in the storage unit.

6. The information processing apparatus according to claim 1, wherein the estimating unit estimates the pressure value associated with each operation location by matching the information of barycentric location candidates and the derived barycentric location.

7. The information processing apparatus according to claim 6, wherein the information of barycentric location candidates comprises a plurality of sets of information, and the derived barycentric location is matched with a corresponding candidate along with an associated set of information when an information of the derived barycentric location corresponds substantially to an information of the associated set of information associated with the corresponding candidate.

8. The information processing apparatus according to claim 1, wherein the type of the user operation associated with the detection of the plurality of operation locations is a multiple finger touch.

9. An information processing method comprising the steps of:
determining a type of a user operation, based upon a detection result from an operation display unit for displaying a display screen and detecting a plurality of operation locations on the display screen based upon a user operation on the display screen;
deriving selectively a barycentric location on the display screen based upon detection results from a plurality of pressure sensors for each detecting a pressure value according to the user operation on the display screen, based upon a determination result from the step of determining; and
estimating a pressure value associated with each detected operation location, based upon a derivation result from the step of deriving and upon information of barycentric location candidates in which information of a combination of pressure values on a plurality of locations on the display screen is recorded in correspondence with information of the barycentric location,
wherein a respective pressure value associated with each individual one of the detected operation locations is estimated, and
wherein the detected pressure value is a same magnitude as a sum of all estimated pressure values.

10. The information processing method of claim 9, further comprising
estimating the pressure values as a selected combination of pressure values that is selected from amongst combinations of pressure values recorded in the information of barycentric location candidates, by which the information of the barycentric location is in correspondence with the derived barycentric location.

11. The information processing method of claim 10, further comprising
deriving a pressure value on the barycentric location; and
estimating the pressure values based upon the derived barycentric location and the derived pressure value and upon the information of barycentric location candidates in which information of the pressure value on the barycentric location is recorded in further correspondence with the information of the barycentric location.

12. The information processing method of claim 9, further comprising
generating the information of barycentric location candidates if a determination result indicating a first operation type corresponding to a case where the plurality of operation locations have been detected by the operation display unit has been made and if no information of barycentric location candidates is stored.

13. The information processing method according to claim 9, wherein the pressure value associated with each operation location is estimated by matching the information of barycentric location candidates and the derived barycentric location.

14. The information processing method according to claim 13, wherein the information of barycentric location candidates comprises a plurality of sets of information, and the derived barycentric location is matched with a corresponding candidate along with an associated set of information when an information of the derived barycentric location corresponds substantially to an information of the associated set of information associated with the corresponding candidate.

15. The information processing method according to claim 9, wherein the type of the user operation associated with the detection of the plurality of operation locations is a multiple finger touch.

* * * * *